US012806766B2

(12) United States Patent
Komoda et al.

(10) Patent No.: US 12,806,766 B2
(45) Date of Patent: Nov. 24, 2026

(54) SELECTION DEVICE, PROCESSING SYSTEM, PROCESSING DEVICE, SELECTION METHOD, AND STORAGE MEDIUM

(71) Applicant: KABUSHIKI KAISHA TOSHIBA, Tokyo (JP)

(72) Inventors: Kazuma Komoda, Yokohama (JP); Hiromasa Takahashi, Minato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 89 days.

(21) Appl. No.: 18/456,620

(22) Filed: Aug. 28, 2023

(65) Prior Publication Data

US 2024/0066688 A1 Feb. 29, 2024

(30) Foreign Application Priority Data

Aug. 29, 2022 (JP) ................................ 2022-136317

(51) Int. Cl.
*B25J 9/16* (2006.01)
*G06T 7/50* (2017.01)
(Continued)

(52) U.S. Cl.
CPC ........... *B25J 9/1612* (2013.01); *B25J 9/1664* (2013.01); *G06T 7/50* (2017.01); *G06T 7/62* (2017.01);
(Continued)

(58) Field of Classification Search
CPC ...... B25J 9/1612; B25J 9/1664; B25J 9/1697; B25J 9/163; G06T 7/50; G06T 7/62;
(Continued)

(56) References Cited

U.S. PATENT DOCUMENTS

2012/0072022 A1* 3/2012 Kim ...................... B25J 9/1666 700/255
2013/0345863 A1 12/2013 Linder et al.
(Continued)

FOREIGN PATENT DOCUMENTS

CN 103221188 A 7/2013
CN 113199483 A 8/2021
(Continued)

OTHER PUBLICATIONS

Office Action issued Jan. 23, 2026 in Japanese Patent Application No. 2022-136317, with English translation.
(Continued)

*Primary Examiner* — Abby Lin
*Assistant Examiner* — Kayla R. Doros
(74) *Attorney, Agent, or Firm* — Oblon, McClelland, Maier & Neustadt, L.L.P.

(57) ABSTRACT

According to one embodiment, a selection device selects an acquisition method of a grip point for gripping an object. Based on object data corresponding to a characteristic of the object, the selection device selects one of a first method or a second method. In the first method, the selection device calculates exterior shape data of the object from an image of the object, and calculates the grip point by using the exterior shape data. In the second method, the selection device inputs the image to a first model that is trained and acquires the grip point output from the first model.

29 Claims, 10 Drawing Sheets

(51) Int. Cl.
*G06T 7/62* (2017.01)
*G06V 20/70* (2022.01)

(52) U.S. Cl.
CPC .... *G06V 20/70* (2022.01); *G06T 2207/20084* (2013.01)

(58) Field of Classification Search
CPC ......... G06T 2207/20084; G06T 7/0004; G06T 7/60; G06T 2207/10024; G06T 2207/30164; G06T 2207/20081; G06T 7/70; G06V 20/70; G06V 10/44; G06V 10/762; G06V 10/774; G06V 10/82; G06V 20/64; G06V 10/764; G05B 2219/39542; G05B 2219/39543; G05B 2219/40053; G05B 2219/39484; G05B 19/4183; G05B 2219/40564; G05B 2219/39536; G05B 19/402; B65G 47/905; G06F 30/20; G06F 2119/14; G06N 3/045; G06N 20/00; G06N 3/0464; G06N 3/08
See application file for complete search history.

(56) References Cited

U.S. PATENT DOCUMENTS

| | | | | |
|---|---|---|---|---|
| 2013/0346348 | A1* | 12/2013 | Buehler | G05B 19/423 901/31 |
| 2017/0190052 | A1 | 7/2017 | Jaekel et al. | |
| 2019/0210223 | A1* | 7/2019 | Goldberg | G06T 17/20 |
| 2020/0030976 | A1* | 1/2020 | Diankov | B25J 9/1666 |
| 2020/0285202 | A1 | 9/2020 | Fujishima et al. | |
| 2020/0319627 | A1* | 10/2020 | Edwards | G05B 19/41885 |
| 2021/0001481 | A1* | 1/2021 | Hayashi | G06N 5/02 |
| 2021/0012116 | A1* | 1/2021 | Urtasun | G06F 18/2155 |
| 2021/0162590 | A1* | 6/2021 | Levine | B25J 9/161 |
| 2021/0171283 | A1* | 6/2021 | Deacon | B62L 3/00 |
| 2021/0291378 | A1* | 9/2021 | Komoda | B25J 9/1697 |
| 2022/0016767 | A1* | 1/2022 | Ku | B25J 9/1697 |
| 2022/0244699 | A1* | 8/2022 | Bley | B25J 9/1612 |
| 2022/0274252 | A1* | 9/2022 | Komoda | B25J 15/0052 |
| 2024/0001544 | A1* | 1/2024 | Suzuki | G06N 3/045 |
| 2025/0249576 | A1* | 8/2025 | Komoda | G06T 7/70 |

FOREIGN PATENT DOCUMENTS

| | | | |
|---|---|---|---|
| JP | 6580602 | B2 | 9/2019 |
| JP | 2019-188516 | A | 10/2019 |
| JP | 2020-87243 | A | 6/2020 |
| JP | 6857332 | B2 | 4/2021 |
| JP | 6884685 | B2 | 6/2021 |
| JP | 2022-131750 | A | 9/2022 |
| WO | WO 2023/153441 | A1 | 8/2023 |

OTHER PUBLICATIONS

Office Action mailed Sep. 21, 2026, in Chinese Application No. 202311101299.5 filed Aug. 29, 2023 (w/English translation).

* cited by examiner

100

| NAME (101) | FIRST METHOD (102) | SECOND METHOD (103) | LABEL (104) |
|---|---|---|---|
| A | ○ | ○ | 1 (SECOND METHOD) |
| B | ○ | × | 0 (FIRST METHOD) |
| C | × | ○ | 1 (SECOND METHOD) |

110

| NAME (111) | WIDTH [cm] (112a) | DEPTH [cm] (112b) | HEIGHT [cm] (112c) | WEIGHT [g] (113) | SHAPE (114) | GLOSS (115) |
|---|---|---|---|---|---|---|
| A | 20 | 15 | 10 | 150 | RECTANGULAR PARALLELEPIPED | YES |
| B | 15 | 15 | 15 | 180 | SPHERE | NO |
| C | 10 | 10 | 8 | 100 | QUADRILATERAL PYRAMID | YES |
| | | | | | | |

SELECTION DEVICE, PROCESSING SYSTEM, PROCESSING DEVICE, SELECTION METHOD, AND STORAGE MEDIUM

CROSS-REFERENCE TO RELATED APPLICATIONS

This application is based upon and claims the benefit of priority from Japanese Patent Application No. 2022-136317, filed on Aug. 29, 2022; the entire contents of which are incorporated herein by reference.

FIELD

Embodiments described herein relate generally to a selection device, a processing system, a processing device, a selection method, and a storage medium.

BACKGROUND

There is a device that grips and transfers objects. Technology that can increase the transfer efficiency of the transfer device is desirable.

DETAILED DESCRIPTION

Figures 1, 2:
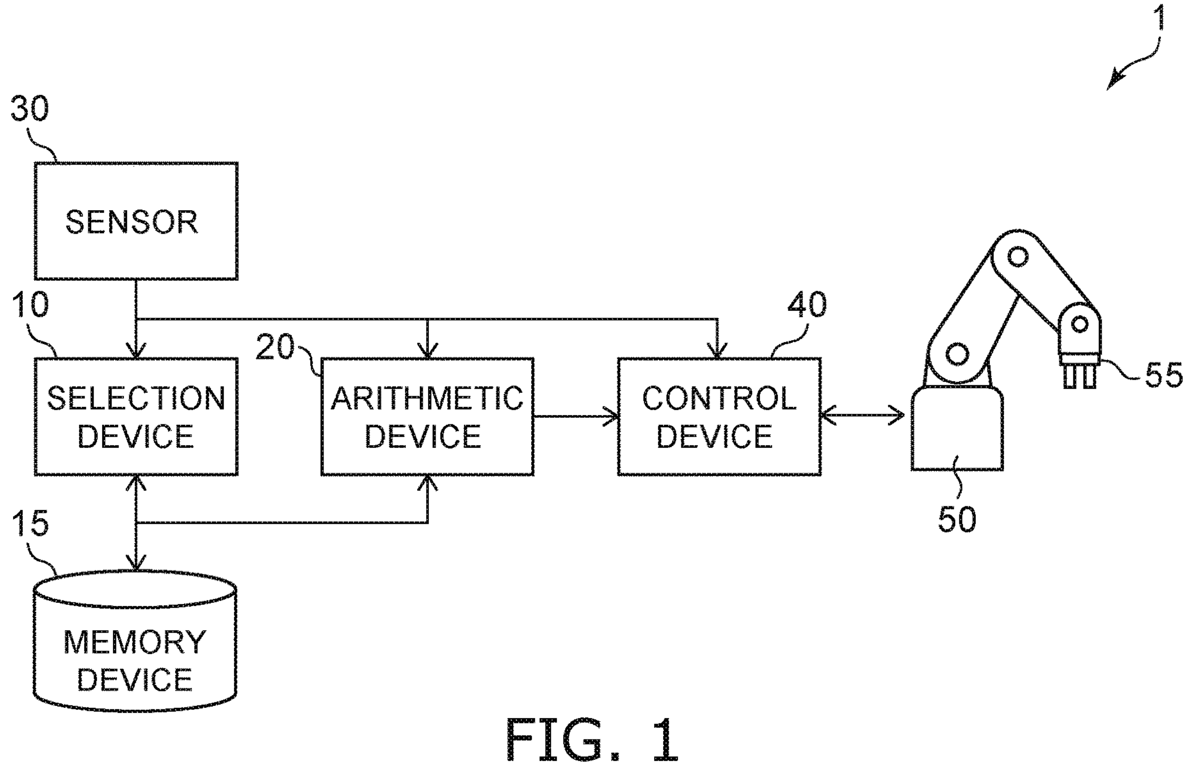
FIG. 1 is a schematic view showing a configuration of a processing system according to an embodiment.
FIG. 2 is a table showing an example of object data.

According to one embodiment, a selection device selects an acquisition method of a grip point for gripping an object. Based on object data corresponding to a characteristic of the object, the selection device selects one of a first method or a second method. In the first method, the selection device calculates exterior shape data of the object from an image of the object, and calculates the grip point by using the exterior shape data. In the second method, the selection device inputs the image to a first model that is trained and acquires the grip point output from the first model.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a configuration of a processing system according to an embodiment.

The processing system 1 according to the embodiment includes a selection device 10, a memory device 15, an arithmetic device 20, a sensor 30, a control device 40, and a transfer device 50.

The transfer device 50 can transfer an object. For example, the transfer device 50 grips an object stored in some container. The transfer device 50 lifts the gripped object and transfers the object to another container. The transfer device 50 releases the gripped object in the other container. The object is placed and stored in the container. Herein, a series of operations including gripping, transferring, and placing is called "picking". For example, the transfer device 50 is a picking robot.

The transfer device 50 includes a gripper 55. The gripper 55 can grip an object by pinching, suction-gripping, jamming, etc. The gripper 55 may include both a mechanism for pinching and a mechanism for suction-gripping, and either mechanism may be selectively used.

The control device 40 controls the transfer device 50. The control device 40 is a so-called robot controller. The control device 40 moves the gripper 55 to a grip point when the transfer device 50 grips the object. The "grip point" is represented by the three-dimensional positions (X, Y, Z) and the three-dimensional angles ($\phi$, $\theta$, $\psi$). The gripper 55 grips the object at the grip point.

The sensor 30 detects the object to be gripped. For example, the sensor 30 is an image sensor. A camera that includes the sensor 30 is used. The camera acquires an image by imaging the object. The camera may acquire a video image. In such a case, a still image is cut out from the video image. The sensor 30 acquires an RGB image or a depth image. Favorably, both an RGB image and a depth image are acquired. A sensor 30 for acquiring an RGB image and another sensor 30 for acquiring a depth image may be used.

Or, the sensor 30 may be a distance sensor. For example, a laser rangefinder (LRF) that includes the sensor 30 is used. The LRF can acquire a depth image by measuring the distances to objects in the surrounding area. Both a camera and a LRF may be used.

The arithmetic device 20 acquires the grip point for the gripper 55 to grip the object. The grip point is acquired using a first method or a second method.

In the first method, the arithmetic device 20 calculates exterior shape data of the exterior shape of the object from the image. The arithmetic device 20 generates a combination (a pattern) of the portion of the exterior shape to be gripped and the grip point of the gripper 55. The arithmetic device 20 generates many patterns while changing the portion to be gripped, the position of the gripper 55, the posture of the gripper 55, etc. The arithmetic device 20 calculates the score of each pattern. The grip point of the pattern for which the best score is obtained is employed as the grip point to be actually used.

In the second method, the arithmetic device 20 inputs the image to a first model. The first model is pre-trained beforehand to calculate the grip point according to the input of the image. The first model includes a neural network. The arithmetic device 20 acquires the grip point output from the first model.

When gripping one object, the arithmetic device 20 acquires the grip point by performing only one of the first method or the second method. When gripping the one object, the arithmetic device 20 does not perform the other of the first method or the second method.

The selection device 10 selects one of the first method or the second method. The arithmetic device 20 performs the acquisition method selected by the selection device 10. When selecting the acquisition method, the selection device 10 refers directly or indirectly to object data corresponding to characteristics of the object. The object data and the first model are prestored in the memory device 15.

FIG. 2 is a table showing an example of the object data.

For example, as shown in FIG. 2, the object data 100 includes a name 101, an evaluation 102, an evaluation 103, and a label 104.

The name 101 indicates the name of each object. The evaluation 102 is the evaluation of gripping when the grip point for each object is calculated by the first method. An affirmative evaluation is input when the object can be gripped at the grip point obtained by the first method. A negative evaluation is input when the object cannot be gripped at the grip point obtained by the first method or when the gripping may be unsuccessful at the grip point. The evaluation 103 is the evaluation of gripping when the grip point is acquired by the second method. An affirmative evaluation is input when the object can be gripped at the grip point obtained by the second method. A negative evaluation is input when the object cannot be gripped at the grip point obtained by the second method or when the gripping may be unsuccessful at the grip point.

The label 104 is an identifier indicating the acquisition method of the grip point of each object. The label 104 is determined based on the evaluations 102 and 103. In the illustrated example, "0" is an example of a first label and indicates that the grip point is acquired by the first method. "1" is an example of a second label and indicates that the grip point is acquired by the second method.

Whether or not the object can be stably gripped at the grip point obtained by the first or second method is dependent on the characteristics of the object. Therefore, the evaluation 102, the evaluation 103, and the label 104 based on the evaluations 102 and 103 indirectly correspond to the characteristics of the object.

When the evaluation 103 related to the second method is affirmative, "1" is input as the label 104 regardless of the evaluation 102 related to the first method. "0" is input as the label 104 when the evaluation 103 related to the second method is negative and the evaluation 102 related to the first method is affirmative.

The selection device 10 extracts the data of the object to be gripped from the object data 100. The selection device 10 refers to the label 104 in the extracted object data. The selection device 10 selects the acquisition method indicated by the label 104 to be the acquisition method of the grip point for the object.

The selection device 10, the memory device 15, the arithmetic device 20, and the sensor 30 are connected to each other via a network, wireless communication, or wired communication. One device may have the functions of both the selection device 10 and the arithmetic device 20. The arithmetic device 20 and the control device 40 are connected to each other via a network, wireless communication, or wired communication.

The selection device 10 transmits the selected acquisition method to the arithmetic device 20. The sensor 30 transmits the acquired image to the arithmetic device 20. The arithmetic device 20 acquires the grip point by using the received acquisition method. The arithmetic device 20 transmits the acquired grip point to the control device 40. The control device 40 moves the gripper 55 to the received grip point and causes the gripper 55 to grip the object at the grip point.

Advantages of the embodiment will now be described.

Methods for obtaining the grip point for gripping the object include the first and second methods described above. As an example, a method may be considered in which multiple grip points are acquired by performing both the first and second methods and by selecting the better grip point. According to this method, many objects can be more stably gripped. On the other hand, a long period of time is necessary to acquire the grip point when both the first and second methods are performed. As a result, the time necessary for the transfer is increased, and the efficiency of the transfer is reduced.

For this problem, the inventor of the embodiment focused on the following points. According to the first method, the optimal position and posture for gripping can be calculated based on the exterior shape data of the object. Compared to the second method, a grip point at which the object can be more stably gripped is obtained. According to the second method, a complex calculation is unnecessary because the grip point is obtained by inputting the image to a model. Compared to the first method, the grip point is obtained in less time. By selectively using the first or second method according to the characteristics of the object, the efficiency of the transfer can be increased while suppressing the reduction of the accuracy of the gripping.

According to the embodiment, the selection device 10 uses object data corresponding to the characteristics of the object to selectively use the first method or second method. For example, as shown in FIG. 2, the object data includes the preregistered labels 104 corresponding to the characteristics of each object. The selection device 10 selects one of the first method or the second method for each object according to the variable of the label 104.

For example, the reduction of the accuracy of the gripping can be suppressed by selecting the first method for an object having a complex exterior shape (surface state). For an object that is easily gripped, the grip point is obtained in less time by selecting the second method. By selecting the acquisition method of the grip point based on the object data, the efficiency of the transfer can be increased while suppressing the reduction of the accuracy of the gripping.

The embodiment will now be described more specifically.

Transfer Device

Figure 3:
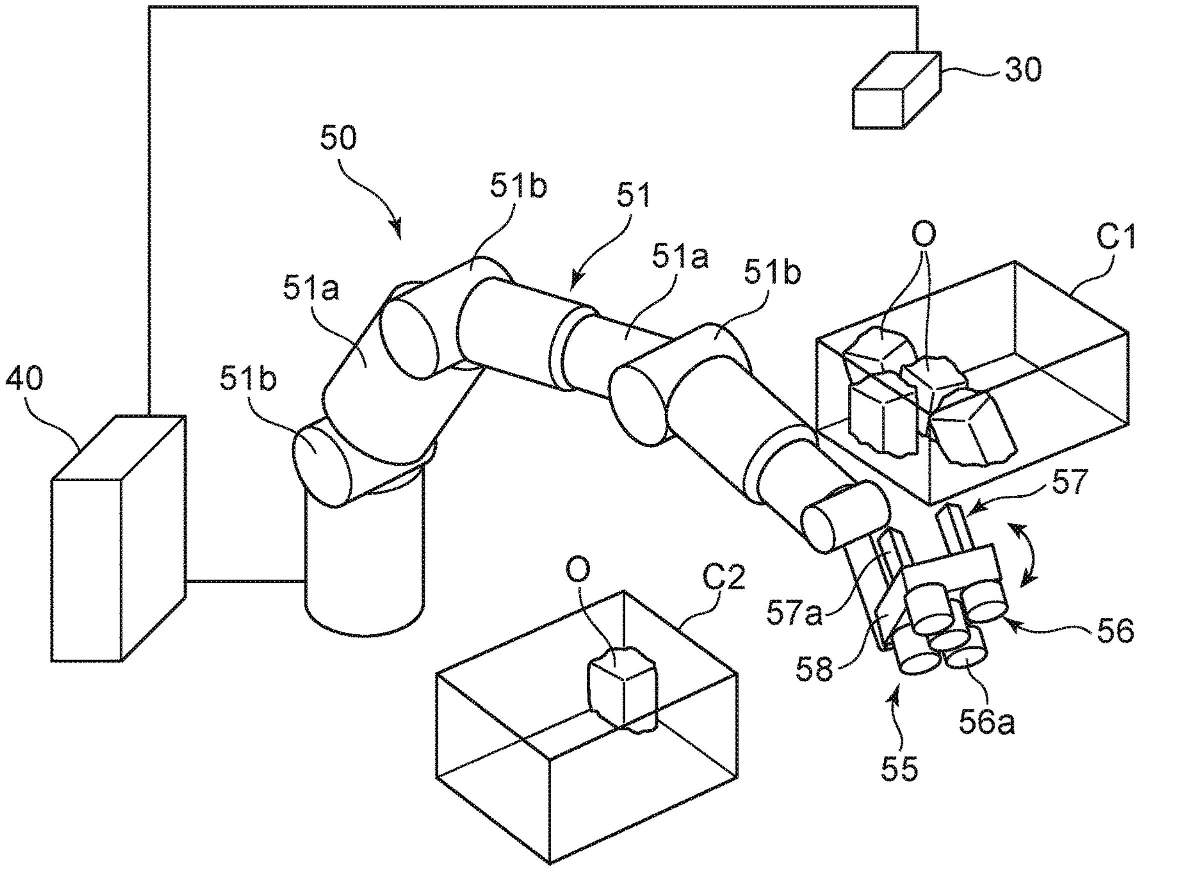
FIG. 3 is a schematic view illustrating a specific configuration of a processing system.

FIG. 3 is a schematic view illustrating a specific configuration of a processing system.

In the example shown in FIG. 3, the transfer device 50 is a vertical articulated robot. The transfer device 50 includes a manipulator 51 that includes multiple links 51*a* and multiple rotation axes 51*b*. The links 51*a* are coupled to each other by the rotation axes 51*b*.

The position and angle of the distal end of the manipulator 51 is changed by operating the rotation axes 51*b*. It is favorable for the distal end of the manipulator 51 to have six degrees of freedom.

The gripper 55 is mounted to the distal end of the manipulator 51. In the illustrated example, the gripper 55 includes a suction mechanism 56 and a pinching mechanism 57.

The suction mechanism 56 grips the object by suction. The suction mechanism 56 includes one or more suction pads 56*a*. The interior of the suction pad 56*a* is depressurized by a not-illustrated depressurizing apparatus in a state in which the suction pad 56*a* contacts the object. Thereby, the object is suction-gripped by the suction pad 56*a*. The number of the suction pads 56*a* may be more or less than in the illustrated example.

The pinching mechanism 57 grips the object by pinching. The pinching mechanism 57 includes multiple rod-shaped support parts 57*a*. The object is pinched and gripped by the multiple support parts 57*a*. The pinching mechanism 57 may include more support parts 57*a* than in the illustrated example. The support part 57*a* may have a finger-like configuration including one or more joints.

The gripper 55 further includes a switching mechanism 58. The suction mechanism 56 and the pinching mechanism 57 are coupled to the switching device 58. The switching device 58 rotates the suction mechanism 56 and the pinching mechanism 57. The mechanism that is used to grip the object can be switched by rotating the suction mechanism 56 and the pinching mechanism 57.

The gripper 55 is not limited to the illustrated example, and may include only one of the suction mechanism 56 or the pinching mechanism 57. In such a case, the switching device 58 is unnecessary.

Two containers C1 and C2 are placed proximate to the transfer device 50. The transfer device 50 grips an object O stored in the container C1 and transfers the object O to the container C2.

The sensor 30 is provided to detect the state inside the container C1. The object O stored in the container C1 is detected from above by the sensor 30. In addition to the sensor 30 for detecting the state inside the container C1, another sensor 30 for detecting the state inside the container C2 may be provided. The sensor 30 may be mounted to the transfer device 50.

Other than that of the illustrated example, the transfer device 50 may be a parallel link robot that includes the gripper 55. The transfer device 50 may be an aircraft (a drone or the like) that includes the gripper 55. Regardless of which transfer device 50 is used, the gripper 55 of the transfer device 50 grips the object at the grip point acquired by the arithmetic device 20.

First Method

In the first method, the safety factor at each grip point is estimated while thoroughly searching through multiple grip points. The safety factor indicates the likelihood that the object O can be transferred without dropping the object O, and corresponds to the score described above. The grip point for which the highest safety factor is obtained is selected from the multiple grip points.

An example of the method for calculating the safety factor when the suction mechanism 56 is used will now be described. The arithmetic device 20 acquires the data detected by the sensor 30 and recognizes the state of various components related to the control of the transfer device 50. For example, the arithmetic device 20 performs the prescribed image processing on the image to calculate "object exterior shape data", "object centroid data", etc., to indicate the state of the various components.

Figure 4:
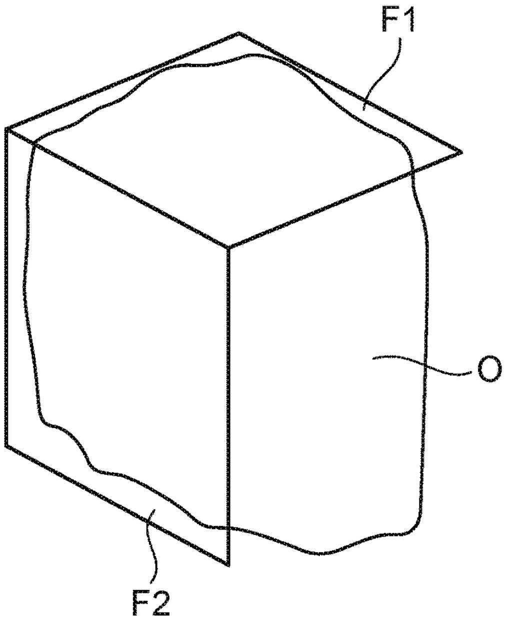
FIG. 4 is a perspective view schematically illustrating a method for calculating the exterior shape data of an object.
Figure 5:
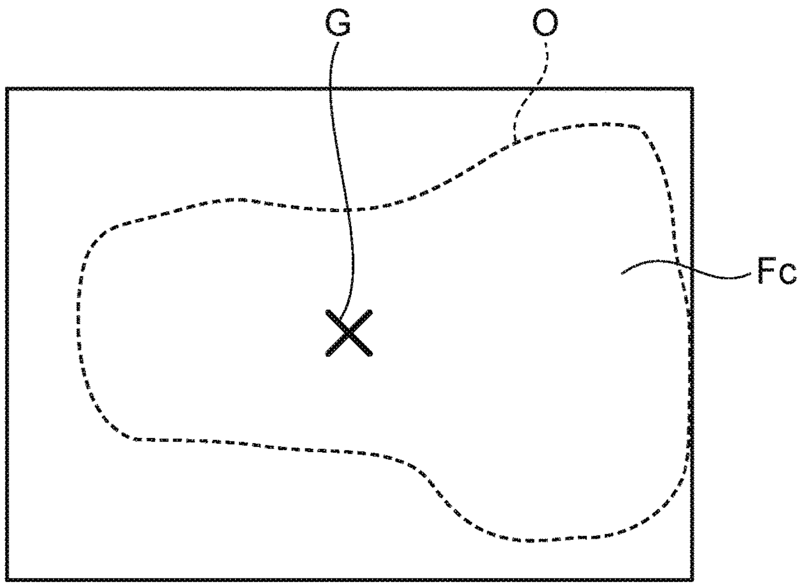
FIG. 5 is a plan view schematically illustrating the method for calculating the exterior shape data of the object.

FIG. 4 is a perspective view schematically illustrating the method for calculating the exterior shape data of the object. FIG. 5 is a plan view schematically illustrating the method for calculating the exterior shape data of the object.

The "object exterior shape data" is calculated using the image of the object O. The object exterior shape data indicates the exterior shape of the object O stored in the container C1 from which the object O will be extracted. For example, as shown in FIG. 4, the object exterior shape data includes data related to a first surface F1 and a second surface F2 of a rectangular parallelepiped circumscribing the object O. The second surface F2 is adjacent to the first surface F1. When an object surface is not planar (when the object surface includes an unevenness), the arithmetic device 20 recognizes the rectangular parallelepiped circumscribing the object surface as the object exterior shape data as shown in FIG. 5. The arithmetic device 20 recognizes the exterior shape when the object is viewed along a specific direction as a grippable region Fc of the object. The grippable region Fc is a planar portion of the object surface that can be suction-gripped.

The arithmetic device 20 calculates the safety factor based on the contact area data and the distance data. The contact area data indicates the surface area where the gripper 55 and the grippable region of the object O contact. The distance data indicates a distance L between a center K of the contact surface and a centroid G of the object O. The contact surface is the surface where the gripper 55 and the object O contact.

The pressure at which the contact surface can be suction-gripped is called the "suction-grip pressure". The stress, i.e., the distance L divided by a second area moment I having the contact surface as the cross section, is called the "divided stress value". The arithmetic device 20 calculates a safety factor R based on the numerical value of the suction-grip pressure divided by the divided stress value. The safety factor R is the value of the suction-grip pressure at the grip point divided by the sum of the bending stress and other tensile stress generated. The bending stress is calculated by the following Formula (1).

$$\sigma(x) = M\frac{x}{1} \quad \text{[Formula 1]}$$

Figure 6:
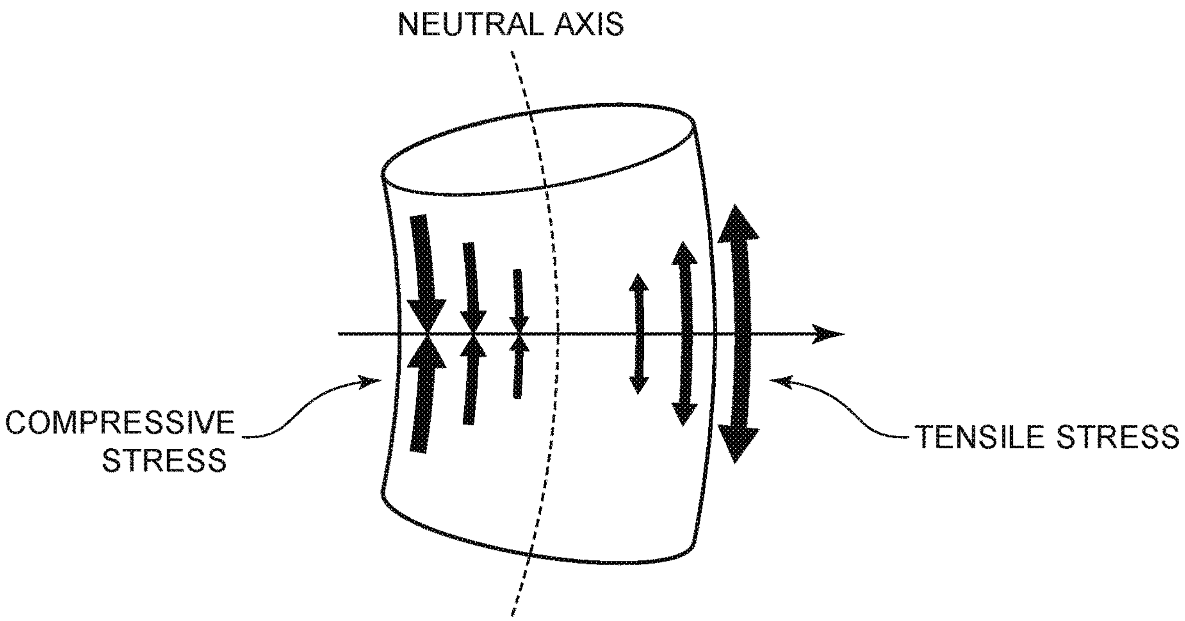
FIG. 6 is a schematic view for describing the distance data of the distance between the center of the contact surface and the centroid of the object.
Figure 7:
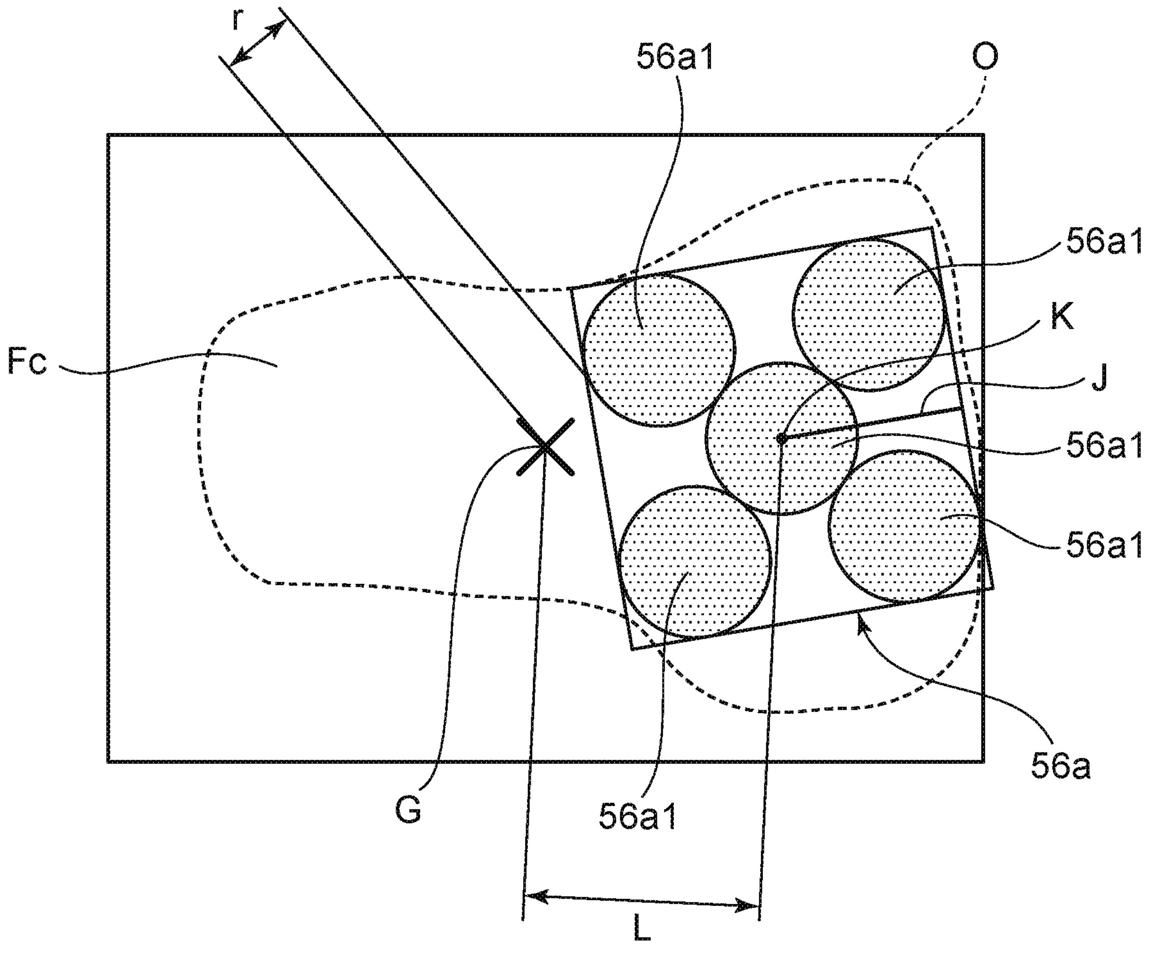
FIG. 7 is a schematic view showing the state when a suction mechanism grips the object.

FIG. 6 is a schematic view for describing the distance data of the distance between the center of the contact surface and the centroid of the object. FIG. 7 is a schematic view showing the state when the suction mechanism grips the object.

In Formula (1), σ(x) is the bending stress, M is the moment, I is the second area moment, and x is the distance from the neutral axis. FIG. 6 shows a model when bending stress acts on a structure body. As shown in FIG. 6, tensile stress and compressive stress are generated in a structure body when bending stress acts on the structure body.

When bending stress acts on a structure body, the structure body fractures when the maximum bending stress is greater than the tensile stress that the structure body can withstand. In the case of suction-gripping, it can be considered that the suction pad 56*a* will detach from the object O being suction-gripped when the maximum bending stress exceeds the vacuum pressure for each suction pad 56*a*. The safety factor R is calculated by the following Formula (2).

$$R = \frac{P}{\sigma + T_s} \quad \text{[Formula 2]}$$

In Formula (2), P is the vacuum pressure (the suction-grip pressure) of any gripping method, a is the bending stress, and Ts is the other tensile stress generated. According to the embodiment, the other tensile stress generated is taken as Ts. The safety factor R is the value of the suction-grip pressure at the grip point divided by the bending stress. By omitting the tensile stress Ts, the safety factor R is calculated by the following Formula (3).

$$R = \frac{P}{M \times \frac{r}{I}} \quad \text{[Formula 3]}$$

In Formula (3), M is the moment determined by the distance L between the center K and the object centroid G. r is the shortest distance between the gripping surface contour and the object centroid G. r is substituted for x in Formula 1. I is the second area moment determined by any gripping method. The example of FIG. 7 shows a case where the object centroid G is positioned outside the gripping surface. In such a case, the shortest distance r is the spacing between the object centroid G and the contour of an effective suction pad 56*a*1 most proximate to the object centroid G. The effective suction pads 56*a*1 are the suction pads 56*a* among the multiple suction pads 56*a* that are used to grip the object O. The contour of the effective suction pad 56*a*1 most proximate to the object centroid G is where the gripping surface detaches most easily.

As described above, to calculate the safety factor R, it is necessary to calculate the second area moment I. When the gripper 55 includes the multiple suction pads 56*a*, the number of combinations of the effective suction pads 56*a*1 used to grip is determined according to the number of the suction pads 56*a* for which the internal pressure is independently controllable. A number Q of combinations of the effective suction pads 56*a*1 used to grip is calculated by the following Formula (4), wherein the number of the suction pads 56*a* for which the internal pressure is independently controllable is N. For example, the number Q is 31 when the internal pressure is independently controllable for each of five suction pads 56*a*.

$$Q = \sum_{i=1}^{i=N} {}_N C_i \quad \text{[Formula 4]}$$

The arrangement directions of the suction pads 56*a* are taken as a first arrangement direction and a second arrangement direction. The first arrangement direction and the second arrangement direction cross each other. The arithmetic device 20 calculates the second area moment I around the first arrangement direction and second arrangement direction while rotating the group of effective suction pads 56*a*1 180 degrees along a plane parallel to the first and second arrangement directions, 1 degree at a time. The arithmetic device 20 performs the calculation for all combinations.

The arithmetic device 20 calculates the safety factor R described above for each second moment I obtained. For example, when the number Q is 31, there are 31×181=5611 patterns of combinations of the effective suction pads 56*a*1 and angles of the suction mechanism 56. The arithmetic device 20 calculates the second moment I and the safety factor R for each pattern. The arithmetic device 20 selects the pattern for which the highest safety factor R is obtained as the grip point actually used in the gripping.

Specific methods for calculating the safety factor when using the suction mechanism 56 are discussed, for example, in paragraphs 0061 to 0096 of JP-A 2021-037608 (Kokai), etc.

An example of a method for calculating the safety factor when the pinching mechanism 57 is used will now be described. Here, a method for calculating the safety factor when two support parts 57*a* grip the object O will be described. When the pinching mechanism 57 include three or more support parts 57*a*, the arithmetic device 20 can calculate the safety factor by approximating the gripping state of the object O as a state in which two support parts 57*a* grip the object O.

Figure 8:
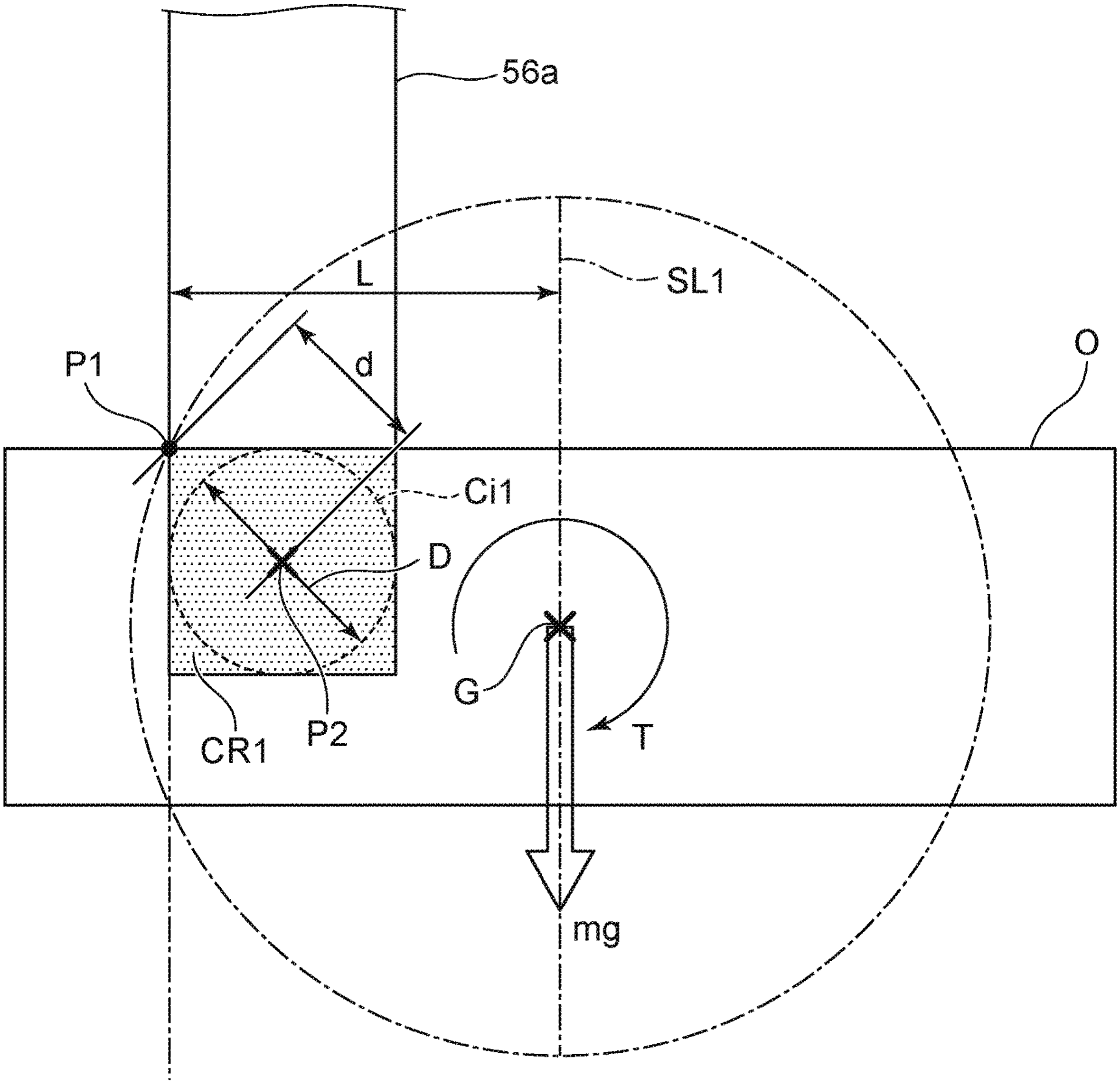
FIG. 8 is a schematic view showing the state when a pinching mechanism grips the object.

FIG. 8 is a schematic view showing the state when the pinching mechanism grips the object.

The arithmetic device 20 calculates the safety factor by using multiple parameters. The multiple parameters include at least a diameter D, a distance d, a length L, and a gravitational force mg. The diameter D is a parameter related to the size of the region where the support part 57*a* and the object O contact. Hereinbelow, this region is called a contact region CR1. The diameter D is the diameter of a circle Ci1 inscribing the contour of the contact region CR1. In the example, the shape of the contact region CR1 is approximated as the circle Ci1. In such a case, the area of the contact region CR1 is estimated to be smaller, and so the arithmetic device 20 can calculate the safety factor with greater consideration of the likelihood of dropping the object O.

The distance d is a parameter related to a position P1 at which the maximum bending stress (torsional stress) is generated in the contact region CR1. The position P1 is the point of the contour of the contact region CR1 most distant to the object centroid G. The distance d is the distance between the position P1 and a center position P2 of the contact region CR1.

The length L is a parameter related to the bending moment (torsional moment) generating bending stress in the contact region CR1. The length L is the length of the arm at which the bending moment is generated. The length L is the distance between the position P1 and a straight line SL1 passing through the object centroid G in the vertical direction. The gravitational force mg is a parameter related to the weight of the object O. The gravitational force mg is the product of a mass m of the object O and a magnitude g of the acceleration due to gravity. A torque T, which is the bending moment generated at the position P1, is represented by the following Formula (5).

$$T = Lmg \quad \text{[Formula 5]}$$

A second area polar moment Ip of the circle Ci1, i.e., the approximate shape of the contact region CR1, is represented by the following Formula (6).

$$Ip = \frac{\pi D^4}{32} \quad \text{[Formula 6]}$$

Bending stress $\tau$ generated by the torque T is represented by the following Formula (7).

$$\tau = \frac{Td}{2Ip} \quad \text{[Formula 7]}$$

Friction pressure Fp generated in the contact region CR1 is represented by the following Formula (8).

$$Fp = \frac{2\mu f}{A} \quad \text{[Formula 8]}$$

In Formula (8), a parameter $f$ is the gripping force of the support part 57*a*, a parameter $\mu$ is the coefficient of friction corresponding to the object O, and a parameter A is the area of the contact region CR1. The friction pressure Fp is generated in all directions inside the contact region CR1. The safety factor R is represented by the following Formula (9).

$$R = \frac{Fp}{\tau} \quad \text{[Formula 9]}$$

When considering the vertically downward stress, the safety factor R is represented by the following Formula (10).

$$R = \frac{Fp}{\tau + mg} \quad \text{[Formula 10]}$$

The arithmetic device 20 calculates the diameter D, the distance d, and the length L based on the object exterior shape data and the object centroid data. The arithmetic device 20 acquires mass data of the mass m of the object O from the memory device 15. The arithmetic device 20 calculates the safety factor R according to the formula above.

The arithmetic device 20 repeatedly calculates the safety factor while modifying the value of at least one of the multiple parameters. Multiple safety factors that correspond respectively to multiple states are calculated thereby. The arithmetic device 20 selects the state in which the highest safety factor is obtained as the grip point.

Specific methods for calculating the safety factor when the pinching mechanism 57 is used are discussed in, for example, paragraphs 0052 to 0107 of JP-A 2021-146434 (Kokai), etc.

Second Method

Figures 9, 10:
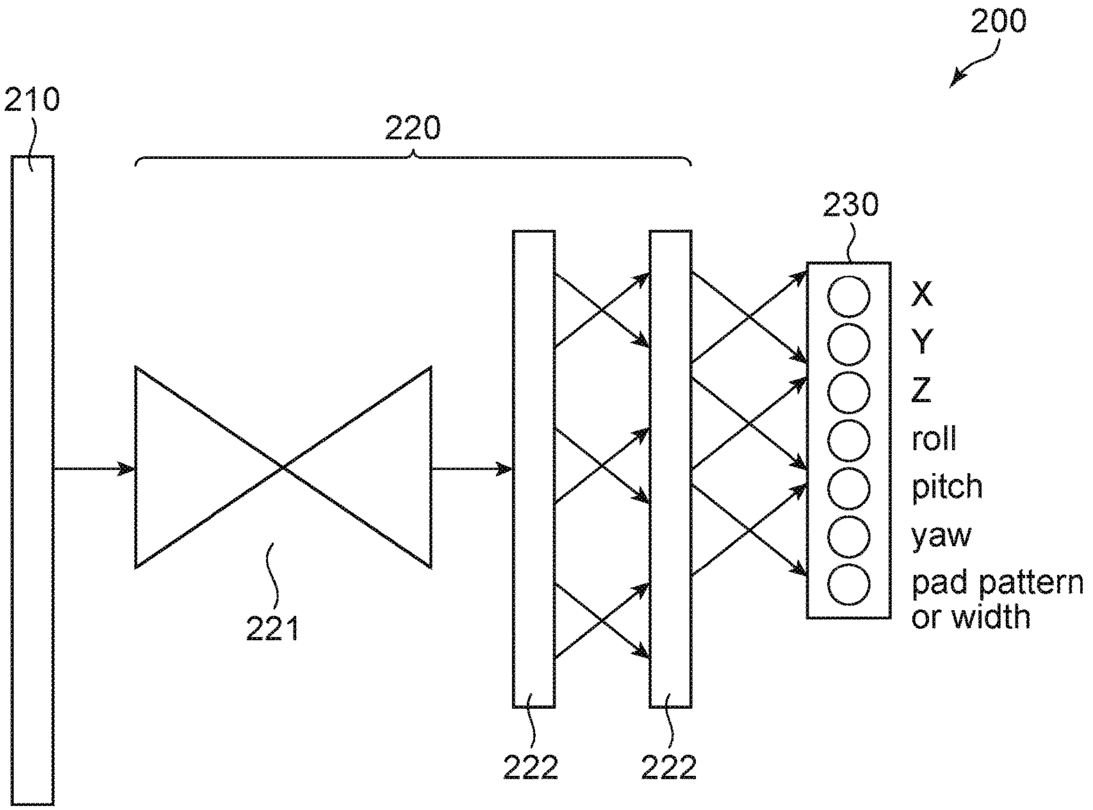
FIG. 9 is a schematic view illustrating a first model.
FIG. 10 is a table showing another example of the object data.

FIG. 9 is a schematic view illustrating the first model.

The first model used in the second method is pre-trained. The first model includes a neural network. To obtain better grip points, it is favorable for the neural network to be a convolutional neural network (CNN) that includes convolutional layers.

The first model 200 shown in FIG. 9 includes an input layer 210, hidden layers 220, and an output layer 230. The image of the object is input to the input layer 210. The hidden layers 220 include convolutional layers. In the illustrated example, the hidden layers 220 include a ResNet 221 and a fully convolutional network (FCN) 222. The output layer 230 outputs the position (X, Y, Z) and the angle ($\phi$, $\theta$, $\psi$).

In the example shown in FIG. 9, the output layer 230 also outputs the gripping method. Specifically, when the object is gripped by the suction mechanism 56, the output layer 230 outputs the combination (the pad pattern) of the suction pads 56*a* utilized to grip the object. When the object is gripped by the pinching mechanism 57, the output layer 230 outputs the spacing (the width) between the support parts 57*a*.

The first model 200 is pre-trained using multiple sets of training data. Each set of training data includes a combination of input images and teaching data. The teaching data indicates the grip point at which the object visible in the input image can be safely gripped, the combination of the suction pads 56*a* (or the spacing between the support parts 57*a*), etc. The hidden layers 220 are trained so that the teaching data is output for the input image.

The training of the first model may be performed by the arithmetic device 20. Another device for training may be prepared. The trained first model is stored in the memory device 15.

Labeling

Each object is pre-labeled, and the label 104 is registered in the object data 100 as shown in FIG. 2. For example, a grip point by the first method and a grip point by the second method are acquired for each object. The object is gripped at each of the grip points; and the evaluations 102 and 103 are determined. The label 104 is determined based on the evaluations 102 and 103.

The label that indicates the acquisition method may be determined using the first data corresponding to the characteristics of the object. Examples of the characteristics include the weight, shape, friction, softness, appearance, etc. For example, a function of the relationship between the acquisition method and a value corresponding to one of the size, weight, shape, friction, softness, or appearance is pre-generated. When gripping an object, the selection device 10 inputs the value of the object data corresponding to the size, weight, shape, friction, softness, or appearance of the object to the function. The selection device 10 determines the label based on the output value of the function.

FIG. 10 is a table showing another example of the object data.

As shown in FIG. 10, the object data 110 may include the columns of name 111, sizes 112*a* to 112*c*, weight 113, shape 114, and gloss 115. The name 111 is the name of each object. The sizes 112*a* to 112*c* are the size (the width, depth, and height) of each object. The weight 113 is the weight of each object. The shape 114 is the shape of each object. The gloss 115 is an example of the appearance, and indicates whether or not the surface of each object has gloss. Other than the existence or absence of gloss, data of the color or pattern of the object surface may be used as data related to the appearance.

The selection device 10 acquires one of the sizes 112*a* to 112*c*, the weight 113, the shape 114, or the gloss 115 from the object data 110 as the first data. The selection device 10 uses the first data to label the acquisition method of the grip point of each object.

In addition to the first data, second data of the state of the disposition of the object also may be used. For example, the relationship between the first data, the second data, and the success rate of the gripping is represented by a bivariate function $f(x, y)$. The selection of the acquisition method for each object is represented by the problem of determining a stationary point (ax, ay) of the bivariate function. The change amounts in the x-direction (the first data) and the y-direction (the second data) are 0 at stationary points. In other words, the points at which the following Formula (11) is satisfied correspond to points at which the acquisition method is switched.

$$\frac{\partial f(x, y)}{\partial x} = \frac{\partial f(x, y)}{\partial y} = 0 \quad \text{[Formula 11]}$$

After a stationary point is obtained, the type of the stationary point is determined. Formula (12) is a Hessian matrix. The coordinates of the stationary point are substituted in the Hessian matrix as in Formula (13).

$$H = \begin{pmatrix} \frac{\partial^2 f(x, y)}{\partial x^2} & \frac{\partial^2 f(x, y)}{\partial x \partial y} \\ \frac{\partial^2 f(x, y)}{\partial x \partial y} & \frac{\partial^2 f(x, y)}{\partial y^2} \end{pmatrix} \quad \text{[Formula 12]}$$

$$H_{(a_x, a_y)} = \begin{pmatrix} \frac{\partial^2 f(x, y)}{\partial x^2}\Big|_{x=a_x, y=a_y} & \frac{\partial^2 f(x, y)}{\partial x \partial y}\Big|_{x=a_x, y=a_y} \\ \frac{\partial^2 f(x, y)}{\partial x \partial y}\Big|_{x=a_x, y=a_y} & \frac{\partial^2 f(x, y)}{\partial y^2}\Big|_{x=a_x, y=a_y} \end{pmatrix} \quad \text{[Formula 13]}$$

The eigenvalues of the matrix shown in Formula (13) are taken as $\lambda_1$ and $\lambda_2$. The stationary point is a minimum point when $\lambda_1>0$ and $\lambda_2>0$. The stationary point is a maximum point when $\lambda_1<0$ and $\lambda_2<0$. The stationary point is a saddle point when $\lambda_1\lambda 2<0$. The stationary point being a maximum point means that the acquisition method of one of the first method or the second method is optimal. The stationary point being a minimum point means that neither acquisition method is appropriate. A saddle point means that either acquisition method may be selected.

Figure 11:
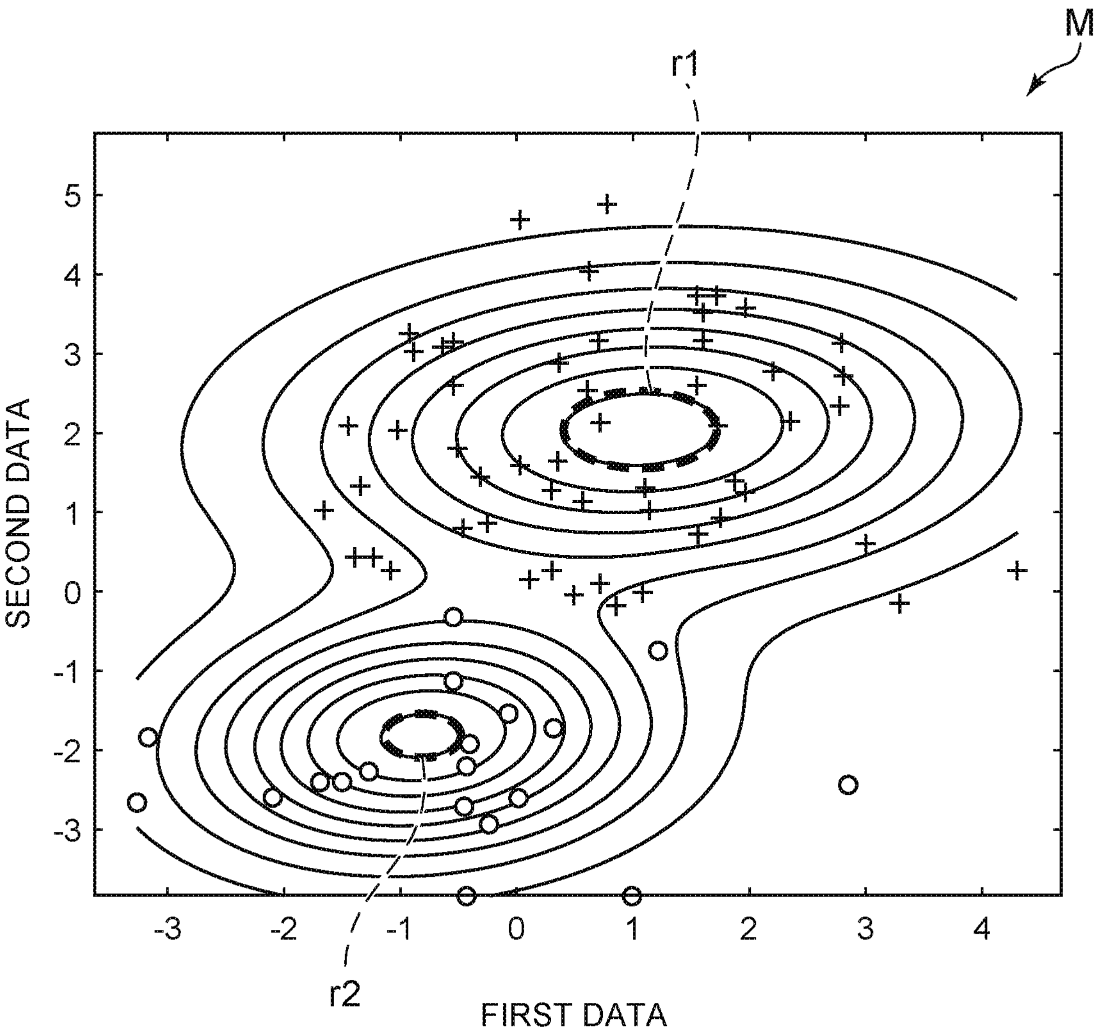
FIG. 11 is a schematic view showing a distribution of stationary points related to multiple objects.

FIG. 11 is a schematic view showing a distribution of stationary points related to multiple objects.

First, training is performed. In the training, multiple sets of training data that include the first data, the second data, and the gripping success rate are prepared. The success rate is the gripping success rate when the first method and the second method each are used to acquire the grip point for the object having the characteristics of the combination of the first and second data. The bivariate function $f(x, y)$ that indicates the relationship of the first data, the second data, and the success rate is generated using the multiple sets of training data.

The first and second data of the object data are input to the bivariate function; and the stationary point (ax, ay) is calculated for each object. The distribution of the stationary points shown in FIG. 11 is obtained by plotting the stationary points (ax, ay). In the example shown in FIG. 11, "+" indicates that the object can be safely gripped at the grip point of the first method. A white circle indicates that the object can be safely gripped at the grip point of the second method. Based on the distribution of the stationary points, a map M of the success rate of the grip point of each method as the first and second data are changed is generated. In the map M shown in FIG. 11, the success rates of the grip points are shown by contour lines.

As shown in FIG. 11, a region (a first region r1) in which the acquisition of the grip point by the first method is most favorable and a region (a second region r2) in which the acquisition of the grip point by the second method is most favorable are obtained in the distribution of the first and second data.

When gripping the object, the selection device 10 calculates the stationary point (ax, ay) by inputting the first and second data of the object to the bivariate function. The selection device 10 calculates the eigenvalues $\lambda_1$ and $\lambda_2$ of the calculated stationary point (ax, ay). The eigenvalues λ1 and λ2 indicate the magnitude of the dispersion of the first and second data that are input with respect to the first and second regions r1 and r2. The selection device 10 calculates the contribution ratio of each method by using the calculated eigenvalues λ1 and λ2. For example, a first contribution ratio $C_1$ of the first method and a second contribution ratio $C_2$ of the second method are calculated by the following Formula (14).

$$C_1 = \frac{\lambda_1}{\lambda_1 + \lambda_2} \qquad C_2 = \frac{\lambda_2}{\lambda_1 + \lambda_2} \quad \text{[Formula 14]}$$

The selection device 10 determines the label by selecting the method corresponding to the greater contribution ratio as the acquisition method of the grip point.

Thus, by mapping the characteristics of the object and by using the map to label each object, the acquisition method of the grip point corresponding to the characteristics of the object can be selected more appropriately.

As an example, there are cases where an object that is soft and has an easily-deformable shape is more difficult to grip than an object that is hard and has a less-deformable shape. In such a case as well, the acquisition method of the grip point can be selected more appropriately by labeling each object by using a map in which the softness is used as the first data. As a result, even soft objects can be gripped with higher accuracy.

Although two data (two variables) included in the object data are used in the example above, more than two variables may be used. For example, the second data and the first data of at least two selected from the size, weight, shape, friction, softness, and appearance of the object may be used. For example, cluster analysis, principal component analysis, etc., can be used as such multivariate analysis.

For example, when cluster analysis is performed, data groups that include multiple combinations of two or more first data, the second data, and the gripping success rate are clustered. The group average method, the k-means algorithm, etc., can be used in the clustering. The clustering may be performed by the selection device 10 or the arithmetic device 20, or may be performed by another device.

Multiple types of maps may be generated. For example, a map related to the second data and one among the first data selected from the size, weight, shape, friction, softness, and appearance of the object is generated. Another map related to the second data and another one among the first data selected from the size, weight, shape, friction, softness, and appearance of the object is generated. The selection device 10 calculates a first distance and a second distance by using the multiple maps. The method that is selected as the acquisition method of the grip point is the method that corresponds to the region in which the shortest distance was obtained among the multiple first distances and the multiple second distances obtained using the multiple maps.

The second data may be calculated by processing the image of the object. Or, the second data may be obtained by inputting the image of the object to a second model. The second model is pre-trained to output a value related to the disposition according to the input of the image. The second model includes a neural network. The arithmetic device 20 inputs the image to the second model and acquires the value (the second data) output from the second model.

For example, the second data is a value indicating the randomness of the disposition. The value of the second data changes according to the number of objects stored in the container, how the objects are placed, the positional relationship between the object to be gripped and the other objects, etc.

One model may function as both the first and second models. For example, the model includes multiple blocks. One or more of the multiple blocks functions as the first model. Another one or more of the multiple blocks functions as the second model. The other one or more of the multiple blocks is operated when one of the first method or the second method is selected. The one or more of the multiple blocks operates when the grip point is acquired by the second method.

The selection device 10 may be configured to display a user interface (UI) that includes the map M. The UI displays the distribution of the stationary points related to the first and second data as shown in FIG. 11. Each object is displayed by being associated with one of the first method or the second method, such as by using the symbols of "+" and white circles. By using the UI, the user can easily ascertain the methods for the grip points and the object characteristics of the objects being gripped.

Figure 12:
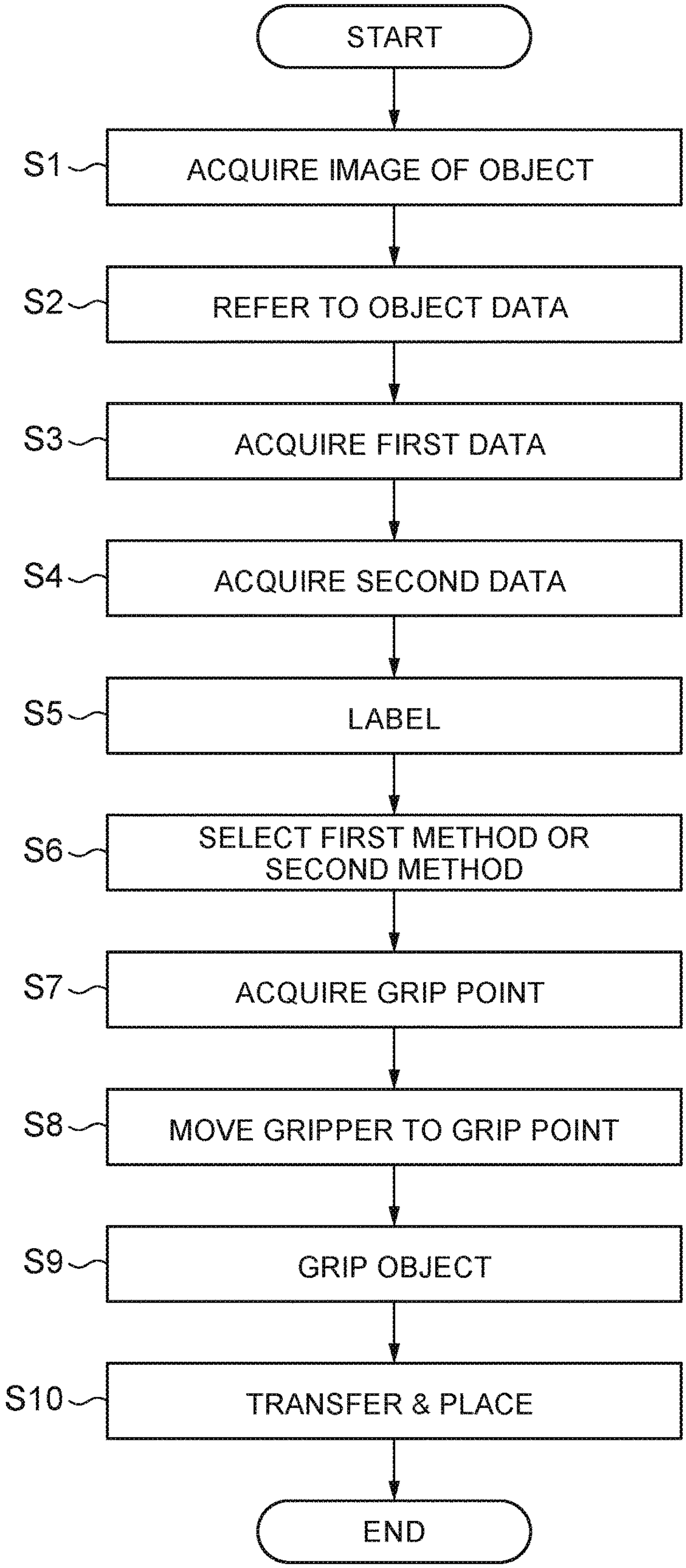
FIG. 12 is a flowchart illustrating a processing method according to the embodiment.

FIG. 12 is a flowchart illustrating a processing method according to the embodiment.

FIG. 12 shows an example of labeling each object by using a bivariate function. The processing system 1 receives instructions of the object to be gripped from a higher-level system. The sensor 30 acquires an image of the object to be gripped (step S1). The selection device 10 refers to object data of the characteristics of the instructed object (step S2). The selection device 10 acquires the first data from the object data (step S3). The selection device 10 acquires the second data by using the image obtained by the sensor 30 (step S4). The selection device 10 labels the object to be gripped by using the bivariate function and the pre-generated map (step S5). The selection device 10 selects one of the first method or the second method according to the assigned label (step S6). The arithmetic device 20 uses the selected method to acquire the grip point (step S7). The control device 40 moves the gripper 55 to the grip point (step S8) and causes the gripper 55 to grip the object (step S9). The control device 40 transfers and places the object in another container (step S10).

Modification

Figure 13:
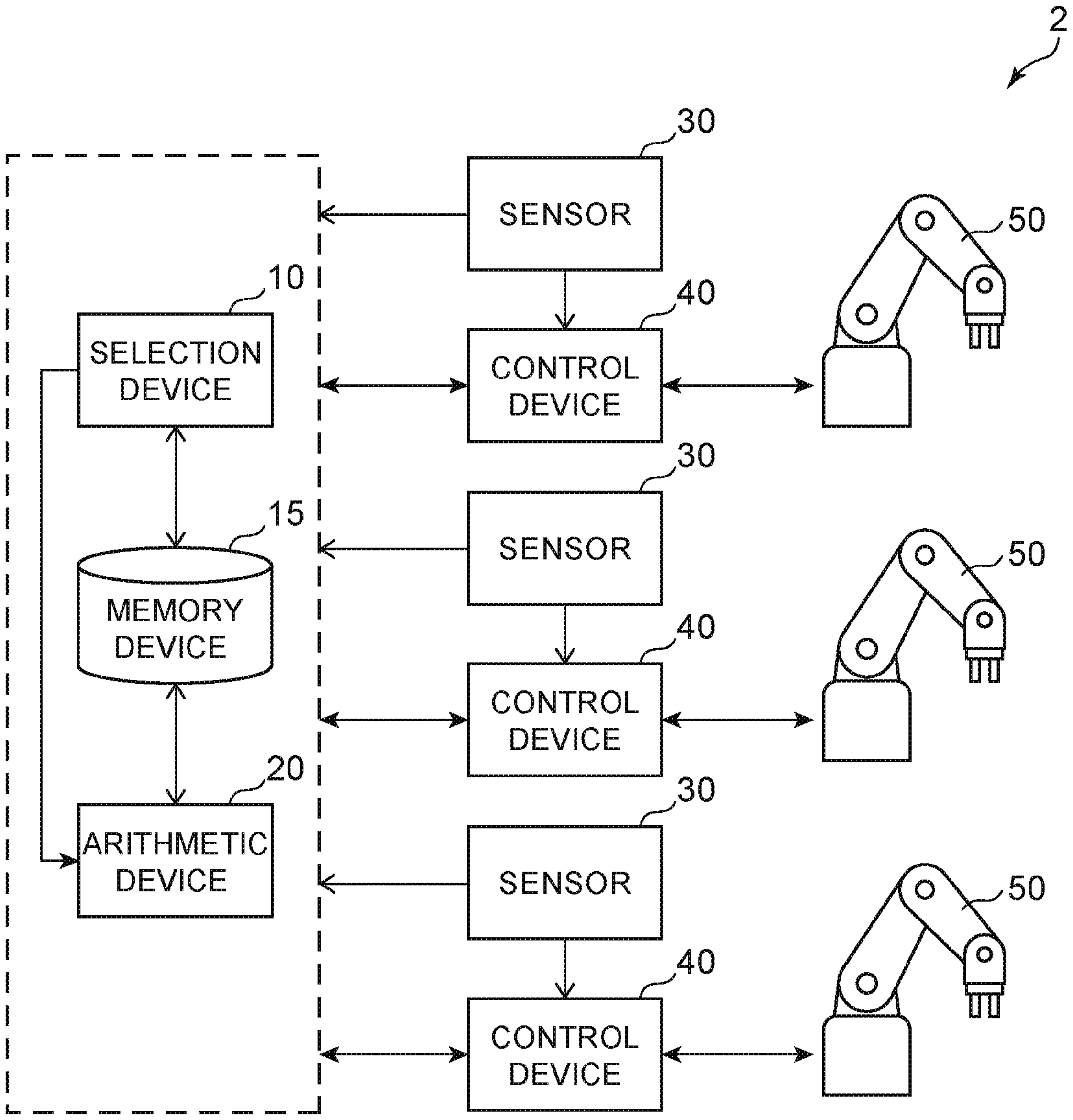
FIG. 13 is a schematic view showing a configuration of a processing system according to a modification of the embodiment.

FIG. 13 is a schematic view showing the configuration of a processing system according to a modification of the embodiment.

In the processing system 2 according to the modification, the selection device 10 selects one of the first method or the second method when the multiple transfer devices 50 each grip objects.

For example, when an image is acquired by one of the sensors 30, the selection device 10 inputs the image to the pre-trained second model. The selection device 10 acquires the second data output from the second model. The selection device 10 uses the second data and device data to select one of the first method or the second method. The device data is data of the characteristics of the transfer devices 50. For example, values that correspond to the size of the transfer device 50, the type of the end effector (the gripper 55), etc., are used as the device data.

For example, similarly to the selection using the first and second data, a relationship between the second data, the device data, and the gripping success rate is represented by the bivariate function $f(x, y)$. The selection of the acquisition method for each object is represented as the problem of determining the stationary point (ax, ay) of the bivariate function. Similarly to the example above, a map is generated based on the second data and the device data of multiple samples.

When receiving the image from the sensor 30, the selection device 10 selects one of the first method or the second method by using the second data obtained from the image, the device data related to the device to perform the gripping, and the map prepared beforehand. The arithmetic device 20 acquires the grip point by the selected method. The arithmetic device 20 transmits the obtained grip point to the control device 40 of the transfer device 50 to perform the gripping.

According to the processing system 2 according to the modification, the acquisition methods of the grip points for the multiple transfer devices 50 can be selected by one selection device 10. It is unnecessary to prepare data for selecting the first method or second method for each transfer device 50. According to the modification, the convenience of the processing system 2 can be improved.

The first data may be used in addition to the second data and the device data. Cluster analysis, principal component analysis, etc., can be used for such multivariate analysis.

In the example above, the selection between the first method, which performs a calculation based on the exterior shape data, and the second method, which uses the trained first model, is applied to the acquisition of the grip point. The embodiment is not limited to this example.

As an example, the path of the transfer may be acquired using the exterior shape data or the first model. The selection device 10 selects one of the first method, which calculates the transfer path of the object based on the exterior shape data, or the second method, which acquires the transfer path by inputting an image to the first model. The arithmetic device 20 acquires the transfer path of the object by performing the selected method.

As another example, defects of the object surface may be detected by the exterior shape data or the first model. The selection device 10 selects one of the first method, which detects a defect of the object surface based on the exterior shape data, or the second method, which obtains an estimation result of the defect by inputting an image to the first model. The arithmetic device 20 detects the defect of the object surface by performing the selected method.

Figure 14:
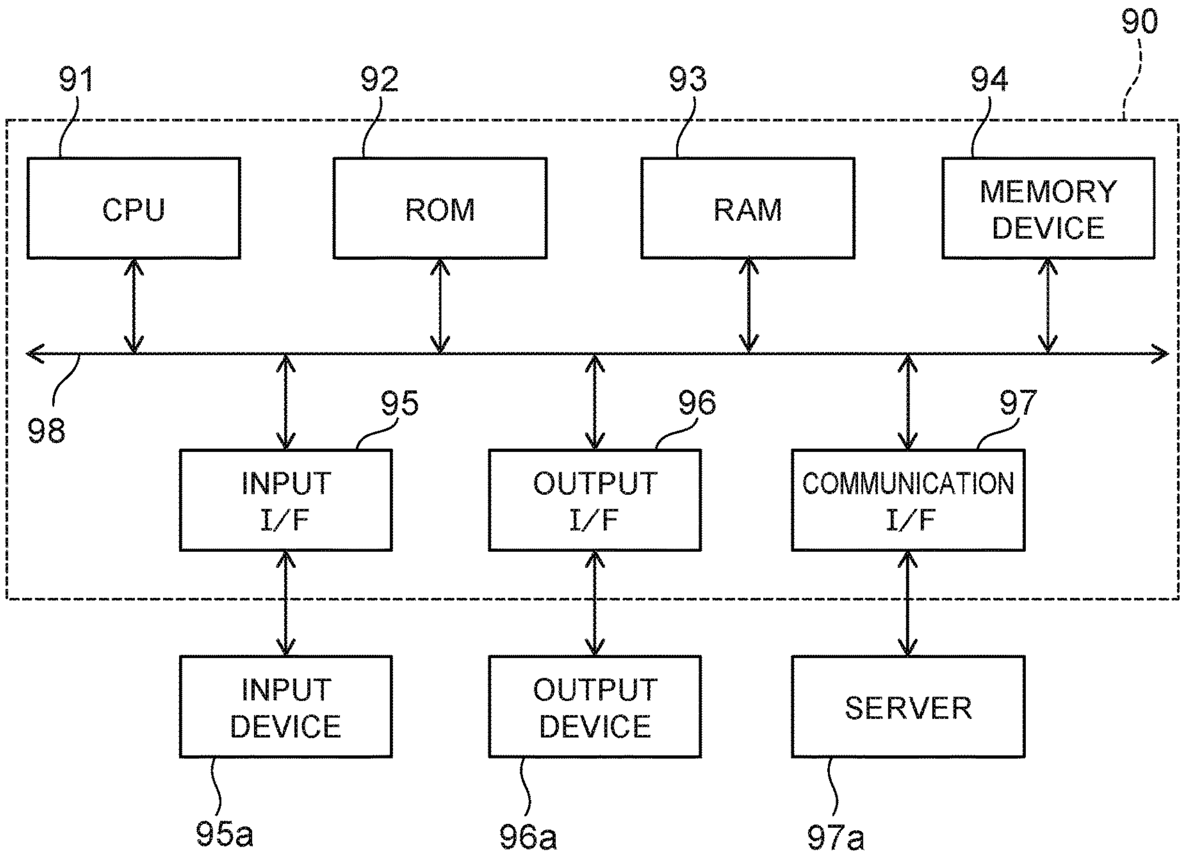
FIG. 14 is a schematic view illustrating a hardware configuration.

FIG. 14 is a schematic view illustrating a hardware configuration.

For example, a computer 90 (a processing device) shown in FIG. 14 is used as the selection device 10, the arithmetic device 20, or the control device 40. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 can connect the computer 90 and an input device 95*a*. The input I/F 95 is, for example, a serial bus interface such as USB, etc. The CPU 91 can read various data from the input device 95*a* via the input I/F 95.

The output interface (I/F) 96 can connect the computer 90 and an output device 96*a*. The output I/F 96 is, for example, an image output interface such as Digital Visual Interface (DVI), High-Definition Multimedia Interface (HPMI (registered trademark)), etc. The CPU 91 can transmit data to the output device 96*a* via the output I/F 96 and cause the output device 96*a* to display an image.

The communication interface (I/F) 97 can connect the computer 90 and a server 97*a* outside the computer 90. The communication I/F 97 is, for example, a network card such as a LAN card, etc. The CPU 91 can read various data from the server 97*a* via the communication I/F 97.

The memory device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor, a projector, a printer, and a speaker. A device such as a touch panel that functions as both the input device 95*a* and the output device 96*a* may be used.

The processing performed by any of the selection device 10, the arithmetic device 20, or the control device 40 may be realized by one computer 90 or may be realized by the collaboration of multiple computers 90. One computer 90 may function as two or more selected from the selection device 10, the arithmetic device 20, and the control device 40.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the selection device, the arithmetic device, the processing system, the processing device, the selection method, and the processing method described above, the efficiency of the transfer can be increased while suppressing the reduction of the accuracy of the gripping. Similar effects can be obtained by using a program causing a computer to function as the selection device or the arithmetic device, or a storage medium in which such a program is stored.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A selection device comprising:

first processing circuitry configured to select an acquisition method of a grip point, the grip point being for gripping an object, and based on object data select one of a first method of calculating exterior shape data of the object from an image of the object, and calculating the grip point by using the exterior shape data, or a second method of inputting the image to a first model and acquiring the grip point output from the first model, the first model being trained, the object data including a first evaluation of gripping when the grip point for the object is obtained by the first method, a second evaluation of gripping when the grip point for the object is obtained by the second method, and a label determined based on the first evaluation and the second evaluation and indicating whether the acquisition method is the first method or the second method, and the acquisition method being selected in accordance with the label, wherein the first processing circuitry is further configured to output the selected acquisition method, and wherein a transfer device is controlled to grip the object in accordance with the grip point obtained from the selected acquisition method.

2. The selection device according to claim 1, wherein the first method is determined to be the acquisition method when the label is a first label, and the second method is determined to be the acquisition method when the label is a second label.

3. The selection device according to claim 2, wherein the object data includes first data of at least one selected from a size, a weight, and a shape of the object.

4. The selection device according to claim 3, wherein second data related to a disposition of the object is acquired using the image, and the label of the object is determined using the first and second data.

5. The selection device according to claim 4, wherein the image is input to a second model, the second model being trained, and the second data output from the second model is acquired.

6. The selection device according to claim 4, wherein the first processing circuitry is configured to:

refer to a function of a relationship between the first data, the second data, and a success rate of gripping, calculate a stationary point when the first and second data related to the object to be gripped are input to the function, and determine the label of the object by using the stationary point.

7. The selection device according to claim 1, wherein the first model includes a neural network.

8. A processing system, comprising:
the selection device according to claim 1; and
an arithmetic device including second processing circuitry, the second processing circuitry being configured to acquire the grip point by using the acquisition method selected by the selection device.

9. The system according to claim 8, further comprising:
a sensor acquiring the image.

10. The system according to claim 8, further comprising:
a control device, wherein
the transfer device includes a gripper that is configured to grip the object, and
the control device is configured to move the gripper to the grip point obtained by the arithmetic device.

11. A processing device comprising:
first processing circuitry configured to display a user interface showing an acquisition method of a grip point, the grip point being for gripping an object,
the user interface including a distribution of a plurality of objects for first data and second data,
the first data being of at least one selected from a size, a weight, and a shape of the object,
the second data being related to a disposition of the object,
each of the plurality of objects being displayed by being associated with one of:
a first method of calculating exterior shape data of the object from an image of the object and calculating the grip point by using the exterior shape data; and
a second method of inputting the image to a first model and acquiring the grip point output from the first model, the first model being trained,
the first method or the second method being selected based on object data including
a first evaluation of gripping when the grip point for the object is obtained by the first method,
a second evaluation of gripping when the grip point for the object is obtained by the second method, and
a label determined based on the first evaluation and the second evaluation and indicating whether the acquisition method is the first method or the second method,
the acquisition method being selected in accordance with the label,
the object data further including a characteristic value of each of the plurality of objects, and
the gripping of the first evaluation being calculated by using the characteristic value, which is at least one selected from a group consisting of friction, softness, color of a surface, pattern of a surface, and gloss of a surface,
wherein the first processing circuitry is further configured to output the selected acquisition method, and
wherein a transfer device is controlled to grip the object in accordance with the grip point obtained from the selected acquisition method.

12. A processing device, comprising:
first processing circuitry configured to perform one of a first method or a second method,
the first method calculating a grip point when gripping an object of a plurality of objects based on exterior shape data of the object,
the second method acquiring a grip point by inputting an image of the object to a model, the model being pre-trained,
the processing device obtaining the grip point of one of the first method or the second method,
the first method or the second method being selected based on object data including
a first evaluation of gripping when the grip point for the object is obtained by the first method,
a second evaluation of gripping when the grip point for the object is obtained by the second method, and
a label determined based on the first evaluation and the second evaluation and indicating whether an acquisition method is the first method or the second method, and
the acquisition method being selected in accordance with the label,
wherein the first processing circuitry is further configured to output the selected acquisition method, and
wherein a transfer device is controlled to grip the object in accordance with the grip point obtained from the selected acquisition method.

13. A selection method selecting an acquisition method of a grip point, the grip point being for gripping an object, the selection method comprising:
selecting one of a first method or a second method based on object data,
the first method calculating exterior shape data of the object from an image of the object and calculating the grip point by using the exterior shape data,
the second method inputting the image to a first model and acquiring the grip point output from the first model, the first model being trained,
the object data including
a first evaluation of gripping when the grip point for the object is obtained by the first method,
a second evaluation of gripping when the grip point for the object is obtained by the second method, and
a label determined based on the first evaluation and the second evaluation and indicating whether the acquisition method is the first method or the second method, and
the acquisition method being selected in accordance with the label,
wherein a transfer device is controlled to grip the object in accordance with the grip point obtained from the selected acquisition method.

14. A non-transitory computer-readable storage medium storing a program, the program causing a computer to execute the selection method according to claim 13.

15. The selection device according to claim 1, wherein
in the first method, centroid data of the object is calculated from the image of the object, and the grip point is calculated by using the exterior shape data and the centroid data.

16. The selection device according to claim 1, wherein, in the first method,
a grippable region of the object is calculated by using the exterior shape data,
distance data indicating a distance between a center of a contact surface and a centroid of the object by using centroid data, the contact surface being a surface between a gripper and the object,
a safety factor is calculated based on the grippable region and the distance data, and
the grip point is calculated based on the safety factor.

17. The selection method according to claim 13, wherein
in the first method, centroid data of the object is calculated from the image of the object, and the grip point is calculated by using the exterior shape data and the centroid data.

18. The selection method according to claim 13, wherein, in the first method, a grippable region of the object is calculated by using the exterior shape data, distance data indicating a distance between a center of a contact surface and a centroid of the object by using centroid data, the contact surface being a surface between a gripper and the object, a safety factor is calculated based on the grippable region and the distance data, and the grip point is calculated based on the safety factor.

19. The selection device according to claim 6, wherein the success rate indicates a gripping success rate when the first method and the second method each are used to acquire the grip point for the object.

20. A selection device comprising:

processing circuitry configured to select an acquisition method of a grip point, the grip point being for gripping an object, and based on object data corresponding to a characteristic of the object, select one of a first method of calculating exterior shape data of the object from an image of the object, and calculating the grip point by using the exterior shape data, or a second method of inputting the image to a first model and acquiring the grip point output from the first model, the first model being trained, wherein the object data includes a label associated with the object, and first data of at least one selected from a size, a weight, and a shape of the object, second data related to a disposition of the object is acquired using the image, the selection device refers to a function of a relationship between the first data, the second data, and a success rate of gripping, the selection device calculates a stationary point when the first and second data related to the object to be gripped are input to the function, the selection device determines the label of the object by using the stationary point, the first method is determined to be the acquisition method when the label is a first label, and the second method is determined to be the acquisition method when the label is a second label, wherein the processing circuitry is further configured to output the selected acquisition method, and wherein a transfer device is controlled to grip the object in accordance with the grip point obtained from the selected acquisition method.

21. The selection device according to claim 2, wherein the first label is assigned to the object when the first evaluation is affirmative, which indicates the object is grippable at the grip point obtained by the first method, and the second label is assigned to the object when the second evaluation is affirmative, which indicates the object is grippable at the grip point obtained by the second method.

22. The selection device according to claim 21, wherein when the second evaluation is affirmative, the second label is assigned to the object regardless of the first evaluation.

23. The selection device according to claim 1, wherein when gripping the object, the grip point is obtained by performing only the selected one of the first method and the second method without performing the other.

24. The selection device according to claim 1, wherein the object data stores, for each of a plurality of objects, the first evaluation, the second evaluation, and the label corresponding to the object.

25. The selection device according to claim 1, wherein the grip point output from the first model includes three-dimensional positions and three-dimensional angles, and the first model further outputs a gripping method parameter including a pad pattern of suction pads when a suction mechanism is used, or a spacing between support parts when a pinching mechanism is used.

26. The selection device according to claim 1, wherein the first processing circuitry is configured to display a user interface including a distribution of a plurality of objects for first data and second data, the first data being of at least one selected from a size, a weight, and a shape of the object, the second data being related to a disposition of the object, and each of the plurality of objects is displayed by being associated with one of the first method and the second method.

27. The selection device according to claim 1, wherein the object data further includes a characteristic value of the object, the characteristic value is at least one selected from a group consisting of friction, softness, color of a surface, pattern of a surface, and gloss of a surface, and the gripping of the first evaluation is calculated by using the characteristic value.

28. The processing device according to claim 12, wherein the object data further includes a characteristic value of the object, the characteristic value is at least one selected from a group consisting of friction, softness, color of a surface, pattern of a surface, and gloss of a surface, and the gripping of the first evaluation is calculated by using the characteristic value.

29. The selection method according to claim 13, wherein the object data further includes a characteristic value of the object, the characteristic value is at least one selected from a group consisting of friction, softness, color of a surface, pattern of a surface, and gloss of a surface, and the gripping of the first evaluation is calculated by using the characteristic value.

* * * * *